United States Patent
Wang et al.

(10) Patent No.: US 12,524,646 B2
(45) Date of Patent: Jan. 13, 2026

(54) VARIABLE CURVATURE BENDING ARC CONTROL METHOD FOR ROLL BENDING MACHINE

(71) Applicants: XI'AN HEAVY EQUIPMENT & TECHNOLOGY CO., LTD., Xi'an (CN); Xi'an University of Technology, Xi'an (CN)

(72) Inventors: Dahao Wang, Xi'an (CN); Yali Wu, Xi'an (CN); Xiaohui Zhao, Xi'an (CN); Bo Yang, Xi'an (CN); Fan Wu, Xi'an (CN); Yali Gao, Xi'an (CN); Huimin Yu, Xi'an (CN); Huaiyu Jia, Xi'an (CN)

(73) Assignees: XI'AN HEAVY EQUIPMENT & TECHNOLOGY CO., LTD., Xi'an (CN); Xi'an University of Technology, Xi'an (CN)

( * ) Notice: Subject to any disclaimer, the term of this patent is extended or adjusted under 35 U.S.C. 154(b) by 0 days.

(21) Appl. No.: 18/959,714

(22) Filed: Nov. 26, 2024

(65) Prior Publication Data
US 2025/0335737 A1    Oct. 30, 2025

(30) Foreign Application Priority Data
Apr. 28, 2024    (CN) .......................... 202410521415.7

(51) Int. Cl.
*G06N 3/006*    (2023.01)
*B21B 37/16*    (2006.01)
(Continued)

(52) U.S. Cl.
CPC ............. *G06N 3/006* (2013.01); *B21B 37/16* (2013.01); *G05B 13/027* (2013.01); *G06N 3/084* (2013.01)

(58) Field of Classification Search
CPC ........ G06N 3/006; G06N 3/084; B21B 37/16; G05B 13/027
(Continued)

(56) References Cited

U.S. PATENT DOCUMENTS

| 4,893,489 A | * | 1/1990 | Mason ..................... B21D 7/08 72/173 |
| 2023/0409920 A1 | | 12/2023 | Sun et al. |

FOREIGN PATENT DOCUMENTS

| CN | 104834215 A | 8/2015 |
| CN | 105373830 A | 3/2016 |

(Continued)

OTHER PUBLICATIONS

A hybrid PSO-GA algorithm for constrained optimization problems, Garg (Year: 2016).*
(Continued)

*Primary Examiner* — Austin Hicks
(74) *Attorney, Agent, or Firm* — Addison D. Ault; IPGentleman Intellectual Property Services, LLC (57) ABSTRACT

A variable curvature bending arc control method for a roll bending machine includes specific steps as follows: collecting and pre-processing data; initializing the network structure, and determining the parameters such as a number of input layer nodes, hidden layer nodes and output layer nodes and other parameters of the back propagation neural network according to the learning sample data; encoding a weight value and a threshold value of a back propagation neural network into individuals in a population according to set coding rules, and initializing the population according to a set population size and a random initialization method; GA-PSO iterative operation; initializing the back propagation neural network parameter; training the back propagation neural network; and an application of the control model. The control method accurately controls the variable curvature bending arc torque for the roll bending machine by combining genetic algorithm, back propagation neural network and particle swarm optimization.

6 Claims, 2 Drawing Sheets

(51) Int. Cl.
*G05B 13/02* (2006.01)
*G06N 3/084* (2023.01)

(58) Field of Classification Search
USPC .......................................................... 706/25
See application file for complete search history.

(56) References Cited

FOREIGN PATENT DOCUMENTS

| | | | |
|---|---|---|---|
| CN | 110363344 A | 10/2019 | |
| CN | 111468572 A | 7/2020 | |
| CN | 114743123 A | 7/2022 | |
| CN | 117522092 A | 2/2024 | |

OTHER PUBLICATIONS

Optimal parameters selection for BP neural network based on particle swarm optimization: A case study of wind speed forecasting, Ren et al (Year: 2013).*

Li Yi, et al., Short-term load forecasting of power system based on Improved Neural Network, Electric Drive Automation, 2019, pp. 12-14,34, vol. 41 No. 3.

* cited by examiner

VARIABLE CURVATURE BENDING ARC CONTROL METHOD FOR ROLL BENDING MACHINE

CROSS REFERENCE TO THE RELATED APPLICATIONS

This application is based upon and claims priority to Chinese Patent Application No. 202410521415.7, filed on Apr. 28, 2024, the entire contents of which are incorporated herein by reference.

TECHNICAL FIELD

The present invention belongs to the field of industrial production control technology, and specifically relates to a variable curvature bending arc control method for a roll bending machine.

BACKGROUND

Roll-bending forming is a metal processing method that rolls a metal sheet or tube in an axial direction by using a roll bending machine. As a common metal forming process, it is widely used in aviation, rocket, ship, automobile, and construction fields.

The principle of roll-bending forming is that a metal sheet or tube is placed between the rollers of a roll bending machine and the metal material is pushed forward by a rolling shaft so that the metal sheet or tube is gradually bent into a desired shape by the rollers. The roller shaft consists of one or more metal rollers arranged as needed to adjust for flexible roll-bending forming, semi-flexible roll-bending forming, or rigid roll-bending forming. As the rollers pass through the metal material, they exert a certain force and bend the metal, meanwhile, the position and angle of the rollers shaft are adjusted to control the degree and shape of the metal bending. Conventional roll bending machines are manually controlled and often need to be formed and shaped repeatedly many times to satisfy the requirements, which is not only inefficient but also costly. In addition, the manufacturing process of variable curvature profile parts is more complicated. Currently the roll-bending forming of large-size and asymmetric section profile parts is still in the theoretical research stage, and effective equipment and mature experience are relatively scarce. However, the forming radius is difficult to control and the smooth transition of profiles with different curvature can not be realized for variable curvature roll-bending profile processing in the current stage.

SUMMARY

An objective of the present invention is to provide a variable curvature bending arc control method for a roll bending machine, the method solves the technical problem that the forming radius of the variable curvature roll bending profile is difficult to control in the existing technology, which leads to the failure to realize the smooth transition of profiles with different curvature.

The technical scheme adopted by the present invention is the variable curvature bending arc control method for the roll bending machine, the method is implemented in accordance with the following steps:

step 1, collecting working data of a roll bending machine and pre-processing the data;

step 2, determining a number of input layer nodes, hidden layer nodes and output layer nodes of a back propagation neural network according to the pre-processed data in step 1;

step 3, encoding a weight value and a threshold value of the back propagation neural network into individuals in a population according to a real number encoding rule, and initializing the population according to a set population size and a random initialization method;

step 4, performing an iterative operation on the population obtained in step 3 according to a genetic algorithm-particle swarm optimization (GA-PSO) algorithm rule to obtain a global optimal individual;

step 5, decoding the global optimal individual obtained in step 4, restoring back propagation neural network structure information, and substituting into the back propagation neural network to obtain an initial weight value and a threshold value of the back propagation neural network;

step 6, repeatedly learning and training the back propagation neural network according to a preset gradient descent supervised learning method and an error back propagation learning algorithm to obtain an optimized back propagation neural network;

step 7, applying a back propagation neural network model optimized in step 6 to an actual control system, so as to accurately control a variable curvature bending arc of a roll-bending profile. The present invention is also characterized by, the pre-processing in step 1 is specifically as follows:

collecting working data of the roll bending machine during a certain time period as a training sample, the training sample including a torque To, a roller pressure Pr, a roller position Pot, a feed velocity V and a material temperature Te, and predicting a torque value and a roller position Pot2 of the roll bending machine during a t2 time period according to a torque value and a roller position Pot1 of the roll bending machine during a t1 time period, wherein time lengths of t1 and t2 are equal;

an input vector P (Tot1, Prt1, Pot1, Vt1, Tet1) and an output vector T (Pot2) are obtained by pre-processing.

Step 2 is specifically as follows:

step 2.1, the number of input layer nodes matches a feature number of the training sample, and each input layer node corresponds to one feature;

step 2.2, the number of nodes at the output layer depends on whether a problem to be solved is a classification problem or a regression problem, and when it is a classification problem, the number of nodes at the output layer is the same as a number of categories; when it is a regression problem, the number of output nodes is one;

an output of a $k^{th}$ neuron in the output layer is:

$$a_{1k} = f_1\left(\sum_{i=1}^{s_1} \omega_{1ki} a_{1i} + b_{1k}\right), k = 1, 2 \ldots \ldots s_1 \quad (1)$$

in Formula (1), $a_{1k}$ is an output of an output layer node k, $a_{1i}$ is an output of a hidden layer node i, $\omega_{1ki}$ is a connection weight value of a node i and a node k, $b_{1k}$ is a threshold value of the output layer node k, $f_1(\bullet)$ is a transfer function of the output layer;

step 2.3, starting the number of hidden layer nodes from a small number of nodes, and then gradually increasing the number of nodes until the performance is stable, an output of a $i^{th}$ neuron in the hidden layer is:

$$a_{2i} = f_2\left(\sum\nolimits_{j=1}^{n} \omega_{2ji}p_j + b_{2i}\right), i = 1, 2 \ldots \ldots s_2 \qquad (2)$$

in Formula (2), $p_j$ is an input of a $j^{th}$ neuron in the input layer, $a_{2i}$ is an output of a hidden layer node i, $\omega_{2ji}$ is a connection weight value of a node i and a node j, $b_{2i}$ is a threshold value of the hidden layer node i, $f_2(\bullet)$ is a transfer function of the hidden layer;

the number of hidden layer nodes in step 2.3 is determined according to an empirical formula $n=\sqrt{n_i+n_o}+a$;

where: n is a number of hidden layer nodes, $n_i$ is a number of input layer nodes, $n_o$ is a number of output layer nodes, a is a constant between 1-10, and a value range of n is 4-13.

Step 4 is specifically as follows:

Step 4.1, initializing the back propagation neural network parameter, presetting a mutation probability $P_m$, a crossover probability $P_c$, a maximum particle velocity $V_{max}$, an inertia constant $\omega$, learning factors $c_1$, $c_2$, a number of iterations epoch and an accuracy of the solution E;

step 4.1.1, crossover operator design, as shown in Formulas (3) and (4):

a. position crossover operation:

$$\begin{cases} X_i(k+1) = \alpha_1 \times X_i(k) + (1-\alpha_1) \times X_j(k) \\ X_j(k+1) = \alpha_1 \times X_j(k) + (1-\alpha_1) \times X_i(k) \end{cases} \qquad (3)$$

b. velocity crossover operation:

$$\begin{cases} V_i(k+1) = \alpha_2 \times V_i(k) + (1-\alpha_2) \times V_j(k) \\ V_j(k+1) = \alpha_2 \times V_j(k) + (1-\alpha_2) \times V_i(k) \end{cases} \qquad (4)$$

in Formula (3) and Formula (4), $\alpha_1$, $\alpha_2$ are random number between [0,1], $x_i$ is a position vector of a $i^{th}$ particle, $x_j$ is a position vector of a $j^{th}$ particle, vi is a velocity vector of a $i^{th}$ particle, $v_j$ is a velocity vector of a $j^{th}$ particle;

step 4.1.2, mutation operator design, selecting an $i^{th}$ individual to mutate, as shown in Formulas (5) and (6):

a. position mutation operation:

$$X_i(k+1) = \begin{cases} X_i(k) + (X_i(k) - X_{max}) * f(g) \\ X_i(k) + (X_{min} - X_i(k)) * f(g) \end{cases} \qquad (5)$$

b. velocity mutation operation:

$$V_i(k+1) = \begin{cases} V_i(k) + (V_i(k) - V_{max}) * f(g) \\ V_i(k) + (V_{min} - V_i(k)) * f(g) \end{cases} \qquad (6)$$

in Formula (5) and Formula (6), $X_{max}$ and $X_{min}$ are upper bound and lower bound of the particle position respectively, $V_{max}$ and $V_{min}$ are maximum value and minimum value of the velocity respectively, and $r_1$, $r_2$, and $r_3$ are random numbers of [0,1], g is a current iteration number, $x_i$ is a position vector of an $i^{th}$ particle; vi is a velocity vector of particles;

step 4.2, population initialization, setting the population size N and a particle dimension n, using a random initialization method to initialize the velocity and position of the particle, encoding the velocity and position information of the particle according to a presetting encoding rule to obtain the initial population, using a fitness function to calculate an individual fitness value of a particle swarm, and updating an individual extremum of the particle and a global extremum of the particle swarm;

step 4.3, updating the position and velocity of the particles by a particle swarm algorithm according to Formula (7) and Formula (8) in the iterative process, a movement of the particle swarm is attracted by a local optimal solution and a global optimal solution, and finally converging to the global optimal solution:

$$v_{i+1} = \omega * v_i + c_1 r_1 (pbest_i - x_i) + c_2 r_2 (gbest_i - x_i) \qquad (7)$$

$$x_{i+1} = x_i + v_{i+1} \qquad (8)$$

in Formula (7) and Formula (8), w is an inertia weight factor, $c_1$ and $c_2$ are learning factors, also known as acceleration constants, the values of $c_1$ and $c_2$ are random numbers between (0,2), and $r_1$ and $r_2$ are uniform random numbers in the range of (0,1); $x_i$ is a position vector of a $i^{th}$ particle, vi is a velocity vector of the particle; $v_{i+1}$ is a velocity vector of the particle in a next iteration, $v_i \in [-v_{max}, v_{max}]$, $v_{max}$ is a constant, $v_{max}$ is set by a user to limit the velocity of the particle; $pbest_i$ is a current optimal position of the particle, that is, the individual extremum, $gbest_i$ is a current optimal position of the particle swarm, that is, the global extremum;

step 4.4, performing a particle swarm crossover operation, using a gambling wheel method selection operator to select some particles with a better fitness value from the particle swarm, using a velocity crossover operator and a position crossover operator to respectively perform a crossover operation on the velocity and position of a particle set according to a set crossover probability $P_c$, comparing the fitness values of two generations of particles before and after the crossover operation, and selecting particles with a better fitness value to put into the particle swarm to enter the next iteration;

step 4.5, a particle swarm mutation operation, selecting some particles with a poor fitness value from the particle swarm, using a velocity mutation operator and a position mutation operator to respectively perform a mutation operation on the velocity and position of the particles according to a set mutation probability $P_m$, and putting the particles obtained by the mutation operation into a population;

step 4.6, calculating a fitness value of the particle swarm, updating the individual extremum $pbest_i$ of the particle, and updating the global extremum $gbest_i$ of the particle swarm;

step 4.7, an algorithm end judgment, judging whether an evolution algebra of the particle satisfies a set maximum evolution algebra or whether the fitness value of the particle swarm satisfies a target value, and if so, then the algorithm ends and outputs a global extremum gbest of the particle swarm, that is, an optimal solution of a problem to be optimized; otherwise, proceed to step 4.3.

Step 5 is specifically as follows:

performing a decoding operation of an inverse process according to the encoding rule, recovering structure information of the back propagation neural network, including the number of nodes of an input layer, a hidden layer and an output layer and connection mode information, and recombining a decoded weight value and a decoded threshold value into a corresponding weight matrix and a threshold value vector;

a process of outputting error back propagation:

obtaining an output value of the back propagation neural network through a forward propagation calculation process of the sample, and learning and correcting the weight value and threshold value of the back propagation neural network by using a back propagation neural network output error;

an error function is:

$$E(\omega, b) = \frac{1}{2}\sum_{k=1}^{s_2} (t_k - a_{2k})^2 \quad (9)$$

in Formula (9), $t_k$ is an expected output, $a_{2k}$ is an actual output of the network, E is an error function;

correcting the weight value of the output layer, the weight value from a $i^{th}$ input to a $k^{th}$ output is:

$$\Delta\omega_{2ki} = -\eta\frac{\partial E}{\partial \omega_{2ki}} = \eta \cdot \delta_{ki} \cdot a_{1i} \quad 0 < \eta < 1 \quad (10)$$

$$\delta_{ki} = e_k f_2' \quad (11)$$

$$e_k = t_k - a_{2k} \quad (12)$$

in Formula (10), Formula (11) and Formula (12), η is a learning coefficient, E is the error criterion function, $\omega_{2ki}$ is the connection weight value of the node i and the node k, $a_{1i}$ is the output of the hidden layer node i, $\delta_{ki}$ is a local gradient of a $i^{th}$ neuron of sample in a $k^{th}$ set, and $$f_2'$$

is a first derivative of the transfer function of the output layer;

correcting the weight value of hidden layer, the weight value from a $j^{th}$ input to a $i^{th}$ output is:

$$\Delta\omega_{ij} = -\eta\frac{\partial E}{\partial \omega_{1ij}} = \eta \cdot \delta_{ij} \cdot p_j \quad 0 < \eta < 1 \quad (13)$$

$$\delta_{ij} = e_i f_1' \quad (14)$$

$$e_i = \sum_{k=1}^{s_2} \delta_{ki} \cdot \omega_{2ki} \quad (15)$$

in Formula (13), Formula (14) and Formula (15), η is a learning coefficient, E is the error criterion function, $\omega_{1ij}$ is the connection weight value of the node i and the node j, $\delta_{ij}$ is a local gradient of a $j^{th}$ neuron of sample in a $i^{th}$ set, $p_j$ is an input of a $j^{th}$ neuron in the input layer, $\omega_{2ki}$ is the connection weight value of the node i and the node k, and $$f_1'$$

is a first derivative of the transfer function of the hidden layer;

correcting the weight values of each layer of the back propagation neural network by taking an output deviation of the back propagation neural network from the output layer to the hidden layer and then to the input layer, regarding the threshold value as the connection weight value of one neuron with an input of 1 to together participate in the adjustment of the weights.

The repeated learning in step 6 is specifically as follows: repeating a process of a forward transmission of an input mode and a backward propagation of an output error continuously, and verifying whether the output error of back propagation neural network reaches a given expected accuracy value; if the output error reaches the expected accuracy value, the learning ends; otherwise, continue to cycle.

The beneficial effects of the present invention are:

in the present invention, a variable curvature bending arc control method for a roll bending machine realizes the accurate control of the variable curvature bending arc torque for the roll bending machine by combining genetic algorithm (GA), back propagation neural network (BP) and particle swarm optimization (PSO); the control performance and robustness of the system are improved by optimizing the controller parameters, so that the roll bending machine can realize the torque control stably and quickly under the condition of large curvature change; the present invention can effectively deal with the control requirements under complex working conditions, improve the production efficiency and product quality, and has a good engineering application prospect; the present invention brings a significant optimization effect for the variable curvature bending arc torque control for the roll bending machine, and solves the technical problem that the forming radius of the variable curvature roll bending profile is difficult to control in the existing technology, which leads to the failure to realize the smooth transition of profiles with different curvature, the present invention has important practical significance and application promotion value.

DETAILED DESCRIPTION OF THE EMBODIMENTS

The following is a detailed description of the present invention in combination with the drawings and the specific embodiments.

Embodiment 1

Figure 1:
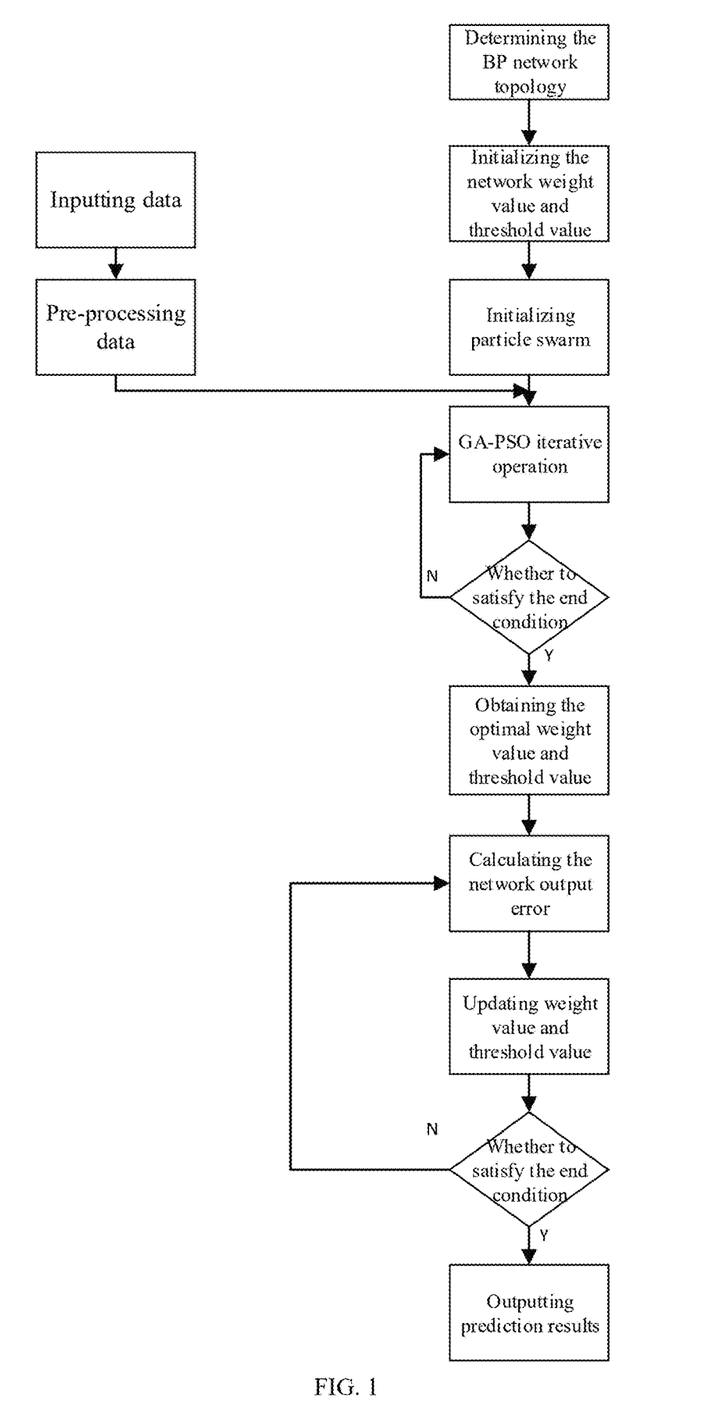
FIG. 1 is a flow diagram of a variable curvature bending arc control method for a roll bending machine of the present invention.
Figure 2:
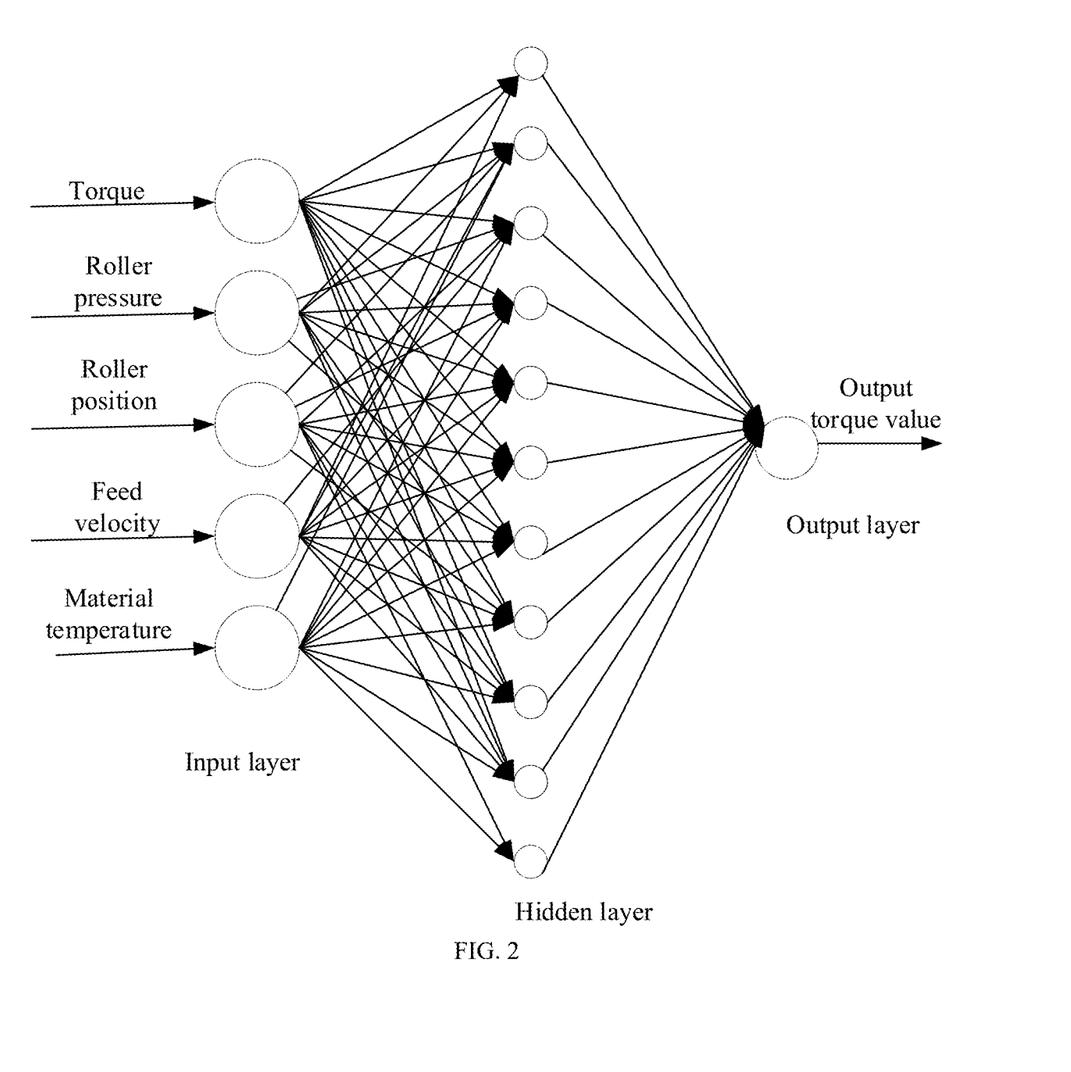
FIG. 2 is a network topology diagram of a back propagation neural network of a variable curvature bending arc control method for a roll bending machine of the present invention.

As shown in FIG. 1 and FIG. 2, the variable curvature bending arc control method for the roll bending machine disclosed in the present invention, specifically the method is implemented in accordance with the following steps:

step 1, working data of a roll bending machine is collected and the data is pre-processed, the key feature parameters are extracted through feature selection and extraction methods, so as to establish the control model;

step 2, a number of input layer nodes, hidden layer nodes and output layer nodes of a back propagation neural network is determined according to the pre-processed data in step 1;

step 3, a weight value and a threshold value of a back propagation neural network are encoded into individuals in a population according to a real number encoding rule, a single piece of coding information contains all the weight values and threshold values of the back propagation neural network, which also represents an individual in the population, and the population are initialized according to a set population size and a random initialization method;

step 4, an iterative operation is performed on the population obtained in step 3 according to a GA-PSO algorithm rule, and the evolutionary algebra or the output error accuracy of the back propagation neural network is preset as the end condition of the algorithm, when the algorithm satisfies the end condition, the global optimal individual is obtained, the global optimal individual is an optimal structural parameter of the back propagation neural network;

step 5, the global optimal individual obtained in step 4 is decoded, back propagation neural network structure information is restored, and substituted into the back propagation neural network to obtain an initial weight value and a threshold value of the back propagation neural network;

step 6, the back propagation neural network is repeatedly learned and trained according to a preset gradient descent supervised learning method and an error back propagation learning algorithm to obtain an optimized back propagation neural network;

step 7, the back propagation neural network model optimized in step 6 is applied to an actual control system, so as to accurately control a variable curvature bending arc of a roll-bending profile.

In the present invention, the variable curvature bending arc control method for the roll bending machine realizes the accurate control of the variable curvature bending arc torque for the roll bending machine by combining genetic algorithm, back propagation neural network and particle swarm optimization. The control performance and robustness of the system are improved by optimizing the controller parameters, so that the roll bending machine can realize the torque control stably and quickly under the condition of large curvature change. The present invention can effectively deal with the control requirements under complex working conditions, improve production efficiency and product quality, and has a good engineering application prospect. The present invention brings a significant optimization effect for the variable curvature bending arc torque control for the roll bending machine, which has important practical significance and application promotion value.

Embodiment 2

On the basis of embodiment 1, the pre-processing in step 1 is specifically as follows:

working data of the roll bending machine during a certain time period are collected as a training sample, the training sample including a torque To, a roller pressure Pr, a roller position Pot, a feed velocity V and a material temperature Te, and a torque value and a roller position Pot2 of the roll bending machine during a t2 time period are predicted according to a torque value and a roller position Pot1 of the roll bending machine during a t1 time period, wherein time lengths of t1 and t2 are equal;

an input vector P (Tot1, Prt1, Pot1, Vt1, Tet1) and an output vector T (Pot2) are obtained by pre-processing.

Further, step 2 is specifically as follows:

step 2.1, the number of input layer nodes matches a feature number of the training sample, and each input layer node corresponds to one feature, in the present invention, the number of input layer nodes of is 5;

step 2.2, the number of nodes at the output layer depends on whether a problem to be solved is a classification problem or a regression problem, and when it is a classification problem, the number of nodes at the output layer is the same as a number of categories; when it is a regression problem, the number of output nodes is one. The present invention is a regression problem, and the number of output layer nodes is 1.

$$a_{1k} = f_1\left(\sum_{i=1}^{s_1} \omega_{1ki} a_{1i} + b_{1k}\right), k = 1, 2 \ldots \ldots s_1 \quad (1)$$

in Formula (1), $a_{1k}$ is an output of an output layer node k, $a_{1i}$ is an output of a hidden layer node i, $\omega_{1ki}$ is a connection weight value of a node i and a node k, $b_{1k}$ is a threshold value of the output layer node k, $f_1(\bullet)$ is a transfer function of the output layer;

step 2.3, the number of hidden layer nodes is determined by experience and experiment, typically, the number of hidden layer nodes is started from a small number of nodes, and then the number of nodes are gradually increased until the performance is stable, an output of a $i^{th}$ neuron in the hidden layer is:

$$a_{2i} = f_2\left(\sum_{j=1}^{n} \omega_{2ji} p_j + b_{2i}\right), i = 1, 2 \ldots \ldots s_2 \quad (2)$$

in Formula (2), $p_j$ is an input of a $j^{th}$ neuron in the input layer, $a_{2i}$ is an output of a hidden layer node i, $\omega_{2ji}$ is a connection weight value of a node i and a node j, $b_{2i}$ is a threshold value of the hidden layer node i, $f_2(\bullet)$ is a transfer function of the hidden layer.

Further, the GA-PSO algorithm in step 4 is specifically as follows:

step 4.1, the back propagation neural network parameter is initialized, a mutation probability $P_m$, a crossover probability $P_c$, a maximum particle velocity $V_{max}$, an inertia constant $\omega$, learning factors $c_1$, $c_2$, a number of iterations epoch and an accuracy of the solution E are preset;

step 4.1.1, crossover operator design, as shown in Formulas (3) and (4):

a. position crossover operation:

$$\begin{cases} X_i(k+1) = \alpha_1 \times X_i(k) + (1-\alpha_1) \times X_j(k) \\ X_j(k+1) = \alpha_1 \times X_j(k) + (1-\alpha_1) \times X_i(k) \end{cases} \quad (3)$$

b. velocity crossover operation:

$$\begin{cases} V_i(k+1) = \alpha_2 \times V_i(k) + (1-\alpha_2) \times V_j(k) \\ V_j(k+1) = \alpha_2 \times V_j(k) + (1-\alpha_2) \times V_i(k) \end{cases} \quad (4)$$

in Formula (3) and Formula (4), $\alpha_1$, and $\alpha_2$ are random numbers between [0,1], $x_i$ is a position vector of a $i^{th}$ particle, $x_j$ is a position vector of a $j^{th}$ particle, vi is a velocity vector of a $i^{th}$ particle, $v_j$ is a velocity vector of a $j^{th}$ particle;

step 4.1.2, mutation operator design, an $i^{th}$ individual is selected to mutate, as shown in Formulas (5) and (6):

a. position mutation operation:

$$X_i(k+1) = \begin{cases} X_i(k) + (X_i(k) - X_{max}) * f(g) \\ X_i(k) + (X_{min} - X_i(k)) * f(g) \end{cases} \quad (5)$$

b. velocity mutation operation:

$$V_i(k+1) = \begin{cases} V_i(k) + (V_i(k) - V_{max}) * f(g) \\ V_i(k) + (V_{min} - V_i(k)) * f(g) \end{cases} \quad (6)$$

in Formula (5) and Formula (6), $X_{max}$, and $X_{min}$ are upper bound and lower bound of the particle position respectively, $V_{max}$, and $V_{min}$ are maximum value and minimum value of the velocity respectively, $r_1$, $r_2$, and $r_3$ are random number of [0,1], g is a current iteration number, xi is a position vector of an $i^{th}$ particle; $v_i$ is a velocity vector of particles;

step 4.2, population initialization, the population size N and a particle dimension n are set, a random initialization method is used to initialize the velocity and position of the particle, and the velocity and position information of the particle is encoded according to a presetting encoding rule to obtain the initial population, a fitness function is used to calculate an individual fitness value of a particle swarm, and an individual extremum of the particle and a global extremum of the particle swarm are updated;

step 4.3, the position and velocity of the particles are updated by a particle swarm algorithm according to Formula (7) and Formula (8) in the iterative process, a movement of the particle swarm is attracted by a local optimal solution and a global optimal solution, and finally converged to the global optimal solution:

$$v_{i+1} = \omega * v_i + c_1 r_1 (pbest_i - x_i) + c_2 r_2 (gbest_i - x_i) \quad (7)$$

$$x_{i+1} = x_i + v_{i+1} \quad (8)$$

in Formula (7) and Formula (8), w is an inertia weight factor, $c_1$ and $c_2$ are learning factors, also known as acceleration constants, the values of $c_1$ and $c_2$ are random numbers between (0,2), and $r_1$ and $r_2$ are uniform random numbers in the range of (0,1); $x_i$ is a position vector of a $i^{th}$ particle, $v_i$ is a velocity vector of the particle; $v_{i+1}$ is a velocity vector of the particle in a next iteration, $vi \in [-v_{max}, v_{max}]$, $v_{max}$ is a constant, $v_{max}$ is set by a user to limit the velocity of the particle; pbest; is a current optimal position of the particle, that is, the individual extremum, gbest; is a current optimal position of the particle swarm, that is, the global extremum;

step 4.4, a particle swarm crossover operation, a gambling wheel method selection operator is used to select some particles with a better fitness value from the particle swarm, a velocity crossover operator and a position crossover operator are used to respectively perform a crossover operation on the velocity and position of a particle set according to a set crossover probability $P_c$, compared the fitness values of two generations of particles before and after the crossover operation, and particles with a better fitness value is selected to put into the particle swarm to enter the next iteration;

step 4.5, a particle swarm mutation operation, some particles with a poor fitness value are selected from the particle swarm, a velocity mutation operator and a position mutation operator are used to respectively perform a mutation operation on the velocity and position of the particles according to a set mutation probability $P_m$, and the particles obtained by the mutation operation are input into a population;

step 4.6, a fitness value of the particle swarm is calculated, the individual extremum pbest$_i$ of the particle is updated, and the global extremum gbest$_i$ of the particle swarm is updated;

step 4.7, an algorithm end judgment, judged whether an evolution algebra of the particle satisfies a set maximum evolution algebra or whether the fitness value of the particle swarm satisfies a target value, and if so, then the algorithm ends and outputs a global extremum gbest of the particle swarm, that is, an optimal solution of a problem to be optimized; otherwise, proceed to step 4.3.

Further, step 5 is specifically as follows:

a decoding operation of an inverse process is performed according to the encoding rule, structure information of the back propagation neural network is recovered, including the number of nodes of an input layer, a hidden layer and an output layer and connection mode information, and a decoded weight value and a decoded threshold value are recombined into a corresponding weight matrix and a threshold value vector;

a process of outputting error back propagation:

an output value of the back propagation neural network is obtained through a forward propagation calculation process of the sample, and a back propagation neural network output error is used to learn and correct the weight value and threshold value of the back propagation neural network;

an error function is:

$$E(\omega, b) = \frac{1}{2} \sum_{k=1}^{s2} (t_k - a_{2k})^2 \quad (9)$$

in Formula (9), $t_k$ is an expected output, $a_{2k}$ is an actual output of the network, E is an error function;

the weight value of output layer is corrected, the weight value from a $i^{th}$ input to a $k^{th}$ output is:

$$\Delta \omega_{2ki} = -\eta \frac{\partial E}{\partial \omega_{2ki}} = \eta \cdot \delta_{ki} \cdot a_{1i} \quad 0 < \eta < 1 \quad (10)$$

$$\delta_{ki} = e_k f_2' \quad (11)$$

$$e_k = t_k - a_{2k} \quad (12)$$

in Formula (10), Formula (11) and Formula (12), η is a learning coefficient, E is the error criterion function, $\omega_{2ki}$ is the connection weight value of the node i and the node k, $a_{1i}$ is the output of the hidden layer node i, $\delta_{ki}$ is a local gradient of an $i^{th}$ neuron of sample in a $k^{th}$ set, and $f'_2$ is a first derivative of the transfer function of the output layer;

the weight value of the hidden layer is corrected, the weight value from a $j^{th}$ input to a $i^{th}$ output is:

$$\Delta \omega_{ij} = -\eta \frac{\partial E}{\partial \omega_{1ij}} = \eta \cdot \delta_{ij} \cdot p_j \quad 0 < \eta < 1 \quad (13)$$

$$\delta_{ij} = e_i f'_1 \quad (14)$$

$$e_i = \sum_{k=1}^{s_2} \delta_{ki} \cdot \omega_{2ki} \quad (15)$$

in Formula (13), Formula (14) and Formula (15), η is a learning coefficient, E is the error criterion function, $\omega_{1ij}$ is the connection weight value of the node i and the node j, $\delta_{ij}$ is a local gradient of a $j^{th}$ neuron of sample in an $i^{th}$ set, $p_i$ is an input of a $j^{th}$ neuron in the input layer, $\omega_{2ki}$ is the connection weight value of the node i and the node k, and $f'_1$ is a first derivative of the transfer function of the hidden layer;

the weight values of each layer of the back propagation neural network are corrected by taking an output deviation of the back propagation neural network from the output layer to the hidden layer and then to the input layer, the threshold value is regarded as the connection weight value of one neuron with an input of 1 to together participate in the adjustment of the weights.

Further, according to the preset gradient descent supervised learning method and error back propagation learning algorithm, the back propagation neural network is repeatedly trained until satisfying the algorithm end, at the end of the algorithm, an final output of the GA-PSO-BP network is obtained, the final output refers to the parameters and weight values obtained after the training of the back propagation neural network, these parameters and weight values are the key factors to control the behavior of the model. The output result is a mapping result corresponding to the input data of the back propagation neural network. The repeated learning in step 6 is specifically as follows: a process of a forward transmission of an input mode and a backward propagation of an output error is repeated continuously, in order to make the output error of the back propagation neural network small enough, each set of training samples of the back propagation neural network usually go through hundreds of repeated training processes before the back propagation neural network can master the mapping relationship between the input and output data, every cycle memory training needs to be verified whether the output error of back propagation neural network reaches a given expected accuracy value; if the output error reaches the expected accuracy value, the learning ends; otherwise, continue to cycle.

Embodiment 3

Since the back propagation neural network model has five input parameters, that is, torque, roller pressure, roller position, feed velocity and material temperature, and one output parameter is the torque value of the roll bending machine at a next moment, the input layer has five nodes and the output layer has one node, the number of hidden layer nodes in step 2.3 is determined according to the empirical formula $n = \sqrt{n_i + n_o} + a$;

where: n is a number of hidden layer nodes, $n_i$ is a number of input layer nodes, $n_o$ is a number of output layer nodes, a is a constant between 1-10, a value range of n is 4-13, in the embodiment, the number of hidden layer nodes is 10.

What is claimed is:

1. A method of producing and controlling automated variable curvature bending of metal on a roll bending machine, comprising the following steps:

step 1, collecting working data from the roll bending machine and pre-processing the working data to obtain pre-processed data, wherein the collecting working data comprises collecting training samples of working data from the roll bending machine for a given metal material for time period t1, wherein a training sample of working data comprises torque To, roller pressure Pr, roller position Pot, feed velocity V and material temperature Te for a bending of the metal material over the time period t1, and wherein the pre-processing comprises predicting a torque and a roller position Pot2 of the roll bending machine during a time period t2 for the given metal according to a torque and a roller position Pot1 for time period t1 of the roll bending machine to obtain the pre-processed data, wherein the time period t1 and the time period t2 are equal, and obtaining an initial input vector P (Tot1, Prt1, Pot1, Vt1, Tet1) according to the collected working data and obtaining an output vector T (Pot2) according to the pre-processed data;

step 2, determining a number of input layer nodes, a number of hidden layer nodes and a number of output layer nodes of a back propagation neural network according to the initial input vector P and the pre-processed data in the step 1;

step 3, encoding a weight value and a threshold value of the back propagation neural network into individuals in a population according to a real number encoding rule, and initializing the population according to a set population size and a random initialization method to obtain an initialized population;

step 4, performing an iterative operation on the initialized population obtained in the step 3 according to a genetic algorithm-particle swarm optimization (GA-PSO) algorithm rule to obtain a global optimal individual;

step 5, decoding the global optimal individual obtained in the step 4, restoring back propagation neural network structure information, and substituting the back propagation neural network structure information into the back propagation neural network to obtain an initial weight value and a threshold value of the back propagation neural network;

step 6, repeatedly learning and training the back propagation neural network according to a preset gradient descent supervised learning method and an error back propagation learning algorithm to obtain an optimized back propagation neural network model; and step 7, applying the optimized back propagation neural network model in the step 6 to a control system of the roll bending machine, to accurately control variable curvature bending arc of a roll-bending profile, wherein, a position and angle of a rollers shaft are adjusted to control a degree and shape of metal bending by the optimized back propagation neural network model.

2. The method of producing and controlling automated variable curvature bending of metal on a roll bending machine according to claim 1, wherein the step 2 is as follows:

step 2.1, matching the number of the input layer nodes with a feature number of the training sample, and wherein each of the input layer nodes corresponds to a feature;

step 2.2, determining the number of the output layer nodes depending on whether a problem to be solved is a classification problem or a regression problem, wherein when the problem to be solved is the classification problem, the number of the output layer nodes is same as a number of categories; and when the problem to be solved is the regression problem, the number of the output layer nodes is one;

wherein an output of a $k^{th}$ neuron in an output layer is:

$$a_{1k} = f_1\left(\sum_{i=1}^{s_1} \omega_{1ki} a_{1i} + b_{1k}\right), k = 1, 2 \ldots \ldots s_1 \quad (1)$$

in Formula (1), $\alpha_{1k}$ is an output of an output layer node k, $\alpha_{1i}$ is an output of a hidden layer node i, $\omega_{1ki}$ is a connection weight value of the hidden layer node i and the output layer node k, $b_{1k}$ is a threshold value of the output layer node k, and $f_1(\cdot)$ is a transfer function of the output layer; and step 2.3, starting the number of the hidden layer nodes from a small number of nodes, and then gradually increasing the number of the nodes until performance is stable, wherein an output of an $i^{th}$ neuron in a hidden layer is:

$$a_{2i} = f_2\left(\sum_{i=1}^{n} \omega_{2ji} p_j + b_{2i}\right), i = 1, 2 \ldots \ldots s_2 \quad (2)$$

in Formula (2), n is the number of the input layer nodes, $p_j$ is an input of a $j^{th}$ neuron in an input layer, $\alpha_{2i}$ is an output of the hidden layer node i, $\omega_{2ji}$ is a connection weight value of the hidden layer node i and a node j, $b_{2i}$ is a threshold value of the hidden layer node i, and $f_2(\cdot)$ is a transfer function of the hidden layer.

3. The method of producing and controlling automated variable curvature bending of metal on a roll bending machine according to claim 2, wherein the number of the hidden layer nodes in the step 2.3 is determined according to an empirical formula $n=\sqrt{n_i+n_o}+a$;

wherein n is the number of the hidden layer nodes, $n_i$ is the number of the input layer nodes, $n_o$ is the number of the output layer nodes, a is a constant between 1-10, and a value range of n is 4-13.

4. The method of producing and controlling automated variable curvature bending of metal on a roll bending machine according to claim 1, wherein the step 4 is as follows:

step 4.1, initializing a back propagation neural network parameter, presetting a mutation probability $P_m$, a crossover probability $P_c$, a maximum particle velocity $V_{max}$, an inertia constant $\omega$, learning factors $c_1$, $c_2$, a number of iterations epoch, and an accuracy of a solution E;

step 4.1.1, designing a crossover operator, as shown in Formula (3) and Formula (4):

a. position crossover operation:

$$\begin{cases} X_i(k+1) = \alpha_1 \times X_i(k) + (1-\alpha_1) \times X_j(k) \\ X_j(k+1) = \alpha_1 \times X_j(k) + (1-\alpha_1) \times X_i(k) \end{cases} \quad (3)$$

b. velocity crossover operation:

$$\begin{cases} V_i(k+1) = \alpha_2 \times V_i(k) + (1-\alpha_2) \times V_j(k) \\ V_j(k+1) = \alpha_2 \times V_j(k) + (1-\alpha_2) \times V_i(k) \end{cases} \quad (4)$$

in the Formula (3) and the Formula (4), $\alpha_1$ and $\alpha_2$ are random numbers between [0,1], $x_i$ is a position vector of an $i^{th}$ particle, $x_j$ is a position vector of a $j^{th}$ particle, $v_i$ is a velocity vector of the $i^{th}$ particle, and $v_j$ is a velocity vector of the $j^{th}$ particle;

step 4.1.2, designing a mutation operator, and selecting an $i^{th}$ individual to mutate, as shown in Formula (5) and Formula (6):

a. position mutation operation:

$$X_i(k+1) = \begin{cases} X_i(k) + (X_i(k) - X_{max}) * f(g) \\ X_i(k) + (X_{min} - X_i(k)) * f(g) \end{cases} \quad (5)$$

b. velocity mutation operation:

$$V_i(k+1) = \begin{cases} V_i(k) + (V_i(k) - V_{max}) * f(g) \\ V_i(k) + (V_{min} - V_i(k)) * f(g) \end{cases} \quad (6)$$

in the Formula (5) and the Formula (6), $X_{max}$ and $X_{min}$ are an upper bound and a lower bound of a particle position respectively, $V_{max}$ and $V_{min}$ are a maximum value and a minimum value of a velocity respectively, $r_1$, $r_2$ and $r_3$ are random numbers of [0,1], g is a current iteration number, $x_i$ is the position vector of the $i^{th}$ particle, and $V_i$ is the velocity vector of the $i^{th}$ particle;

step 4.2, initializing the population, setting a population size N and a particle dimension n, using the random initialization method to initialize a velocity and a position of a particle, encoding velocity and position information of the particle according to the real number encoding rule to obtain the initialized population, using a fitness function to calculate an individual fitness value of a particle swarm, and updating an individual extremum of the particle and a global extremum of the particle swarm;

step 4.3, updating the position and the velocity of the particles by a particle swarm algorithm according to Formula (7) and Formula (8) in an iterative process, wherein a movement of the particle swarm is attracted by a local optimal solution and a global optimal solution, and finally converging to the global optimal solution:

$$v_{i+1} = \omega * v_i + c_1 r_1 (pbest_i - x_i) + c_2 r_2 (gbest_i - x_i) \qquad (7)$$

$$x_{i+1} = x_i + v_{i+1} \qquad (8)$$

wherein in the Formula (7) and the Formula (8), ω is an inertia weight factor, $c_1$ and $c_2$ are the learning factors, also known as acceleration constants, values of $c_1$ and $c_2$ are random numbers between (0,2), and $r_1$ and $r_2$ are uniform random numbers in a range of (0,1); $x_i$ is the position vector of the $i^{th}$ particle, $v_i$ is the velocity vector of the $i^{th}$ particle; $V_{i+1}$ is a velocity vector of the particle in a next iteration, $v_i \in [-v_{max}, v_{max}]$, $v_{max}$ is a constant, $v_{max}$ is set by a user to limit the velocity of the particle; $pbest_i$ is a current optimal position of the particle, wherein the current optimal position of the particle is the individual extremum of the particle, $gbest_i$ is a current optimal position of the particle swarm, wherein the current optimal position of the particle swarm is the global extremum of the particle swarm;

step 4.4, performing a particle swarm crossover operation, using a gambling wheel method selection operator to select a plurality of particles with a first better fitness value from the particle swarm, using a velocity crossover operator and a position crossover operator to respectively perform a crossover operation on a velocity and a position of a particle set according to the crossover probability $P_c$, comparing fitness values of two generations of particles before and after the crossover operation, and selecting particles with a second better fitness value to put into the particle swarm to enter the next iteration;

step 4.5, performing a particle swarm mutation operation, selecting a plurality of particles with a poor fitness value from the particle swarm, using a velocity mutation operator and a position mutation operator to respectively perform a mutation operation on a velocity and a position of the plurality of particles with the poor fitness value according to the mutation probability Pm, and putting particles obtained by the mutation operation into the population;

step 4.6, calculating a fitness value of the particle swarm, updating the individual extremum $pbest_i$ of the particle, and updating the global extremum $gbest_i$ of the particle swarm; and step 4.7, judging an algorithm end, judging whether an evolution algebra of the particle satisfies a set maximum evolution algebra or whether the fitness value of the particle swarm satisfies a target value, wherein when the evolution algebra of the particle satisfies the set maximum evolution algebra or the fitness value of the particle swarm satisfies the target value, then the particle swarm algorithm ends and outputs the global extremum gbest of the particle swarm, wherein the global extremum gbest of the particle swarm is an optimal solution of a problem to be optimized; and wherein when the evolution algebra of the particle does not satisfy the set maximum evolution algebra and the fitness value of the particle swarm does not satisfy the target value, proceed to the step 4.3.

5. The method of producing and controlling automated variable curvature bending of metal on a roll bending machine according to claim 1, wherein the step 5 is as follows:

performing a decoding operation of an inverse process according to the real number encoding rule, restoring the back propagation neural network structure information, wherein the back propagation neural network structure information comprises the number of the input layer nodes, the number of the hidden layer nodes, the number of the output layer nodes and connection mode information, and recombining a decoded weight value and a decoded threshold value into a corresponding weight matrix and a threshold value vector;

wherein a process of outputting an error back propagation is as follows:

obtaining an output value of the back propagation neural network through a forward propagation calculation process of a sample, and learning and correcting the weight value and threshold value of the back propagation neural network by using a back propagation neural network output error;

wherein an error function is:

$$E(\omega, b) = \frac{1}{2} \sum_{k=1}^{s_2} (t_k - a_{2k})^2 \qquad (9)$$

in Formula (9), $t_k$ is an expected output, $a_{2k}$ is an actual output of the back propagation neural network, and E is the error function;

correcting a weight value of an output layer, wherein a weight value from an $i^{th}$ input to a $k^{th}$ output is:

$$\Delta \omega_{2ki} = -\eta \frac{\partial E}{\partial \omega_{2ki}} = \eta \cdot \delta_{ki} \cdot a_{1i} \quad 0 < \eta < 1 \qquad (10)$$

$$\delta_{ki} = e_k f_2' \qquad (11)$$

$$e_k = t_k - a_{2k} \qquad (12)$$

wherein in Formula (10), Formula (11) and Formula (12), n is a learning coefficient, E is an error criterion function, $\omega_{2ki}$ is a connection weight value of a hidden layer node i and an output layer node k, $\alpha_{1i}$ is an output of the hidden layer node i, $\delta_{ki}$ is a local gradient of an $i^{th}$ neuron of a sample in a $k^{th}$ set, and $$f_1'$$

is a first derivative of a transfer function of the output layer;

correcting a weight value of a hidden layer, wherein the weight value from a $j^{th}$ input to an $i^{th}$ output is:

$$\Delta \omega_{ij} = -\eta \frac{\partial E}{\partial \omega_{1ij}} = \eta \cdot \delta_{ij} \cdot p_j \quad 0 < \eta < 1 \qquad (13)$$

$$\delta_{ij} = e_i f_1' \qquad (14)$$

$$e_i = \sum_{k=1}^{s_2} \delta_{ki} \cdot \omega_{2ki} \qquad (15)$$

wherein in Formula (13), Formula (14) and Formula (15), n is the learning coefficient, E is the error criterion function, $\omega_{1ij}$ is a connection weight value of the hidden layer node i and a node j, $\delta_{ij}$ is a local gradient of a $j^{th}$ neuron of a sample in an $i^{th}$ set, $p_j$ is an input of the $j^{th}$ neuron in an input layer, $\omega_{2ki}$ is the connection weight value of the hidden layer node i and the output layer node k, and $$f_2'$$

is a first derivative of a transfer function of the hidden layer; and correcting weight values of each layer of the back propagation neural network by taking an output deviation of the back propagation neural network from the output layer to the hidden layer and then to the input layer, and regarding the threshold value as a connection weight value of a neuron with an input of 1 to together participate in an adjustment of weights.

6. The method of producing and controlling automated variable curvature bending of metal on a roll bending machine according to claim 1, wherein a repeated learning in the step 6 is as follows: repeating a process of a forward transmission of an input mode and a backward propagation of an output error continuously, and verifying whether the output error of the back propagation neural network reaches a given expected accuracy value; wherein when the output error reaches the given expected accuracy value, the repeated learning ends; and wherein when the output error does not reach the given expected accuracy value, continue to cycle.

\* \* \* \* \*